US012083696B2

(12) United States Patent
Dovel

(10) Patent No.: US 12,083,696 B2
(45) Date of Patent: Sep. 10, 2024

(54) KNIFE WITH SLIDING GEAR

(71) Applicant: DAREX, LLC, Ashland, OR (US)

(72) Inventor: Daniel T. Dovel, Ashland, OR (US)

(73) Assignee: DAREX, LLC, Ashland, OR (US)

( * ) Notice: Subject to any disclaimer, the term of this patent is extended or adjusted under 35 U.S.C. 154(b) by 0 days.

(21) Appl. No.: 18/313,838

(22) Filed: May 8, 2023

(65) Prior Publication Data

US 2024/0001570 A1 Jan. 4, 2024

Related U.S. Application Data

(62) Division of application No. 17/966,289, filed on Oct. 14, 2022, now Pat. No. 11,679,517, which is a division of application No. 17/856,102, filed on Jul. 1, 2022, now Pat. No. 11,571,826.

(51) Int. Cl.
*B26B 5/00* (2006.01)

(52) U.S. Cl.
CPC .................................... *B26B 5/003* (2013.01)

(58) Field of Classification Search
CPC ........... B26B 5/00; B26B 5/001; B26B 5/003; B26B 1/08
See application file for complete search history.

(56) References Cited

U.S. PATENT DOCUMENTS 3,639,706 A 2/1972 Purdy
4,200,977 A 5/1980 Kageyama et al.
4,868,985 A 9/1989 Rehm
5,207,696 A 5/1993 Matwijcow
5,349,753 A 9/1994 Gaffney
6,623,499 B1 9/2003 Andreini et al.
7,575,583 B1 8/2009 Schraga
10,092,231 B2 10/2018 Kan
10,124,495 B2 11/2018 Gallegos et al.
10,179,415 B2 1/2019 Landwehr
10,525,507 B2 1/2020 Defino
(Continued)

FOREIGN PATENT DOCUMENTS

CA 2999573 A1 9/2018
CN 106737880 A 5/2017
(Continued)

OTHER PUBLICATIONS

Notice of Allowance for U.S. Appl. No. 17/856,102; mailed Oct. 20, 2022.

(Continued)

*Primary Examiner* — Jennifer S Matthews
(74) *Attorney, Agent, or Firm* — Workman Nydegger

(57) ABSTRACT

A utility knife includes a blade, a housing to store the blade, an actuator, and a pinion gear to deploy the blade. The pinion gear includes one or more sets of teeth that are engaged with a fixed rack of the housing and a sliding rack of the blade holder. The pinion gear is also coupled to the actuator, which is configured to linearly translate the pinion gear. As the pinion gear linearly translates between front and back ends of the housing, the pinion gear rotates due to its engagement with the fixed rack. The further engagement between the pinion gear and the sliding rack causes the sliding rack to advance in the same linear direction as the pinion gear by a distance that is greater than the linear distance traversed by the pinion gear, thereby advancing or retracting the blade connected to the blade holder.

19 Claims, 6 Drawing Sheets

(56) References Cited

U.S. PATENT DOCUMENTS

| | | | |
|---|---|---|---|
| 10,525,607 | B1 | 1/2020 | Vayntraub |
| 10,800,053 | B1 | 10/2020 | Liu |
| 10,981,284 | B2 | 4/2021 | Delplanche |
| 11,679,517 | B1 | 6/2023 | Dovel |
| 2006/0053631 | A1 | 3/2006 | Fossella |
| 2012/0017442 | A1 | 1/2012 | King |
| 2012/0304469 | A1 | 12/2012 | Powell |
| 2018/0281209 | A1 | 10/2018 | Landwehr |
| 2019/0224861 | A1 | 7/2019 | Bloch et al. |
| 2021/0252723 | A1 | 8/2021 | Gallegos |
| 2021/0316464 | A1 | 10/2021 | Alexander |
| 2023/0202061 | A1 | 6/2023 | Xu |

FOREIGN PATENT DOCUMENTS

| | | | |
|---|---|---|---|
| CN | 207874277 | U | 9/2018 |
| EP | 2979828 | A1 | 2/2016 |
| KR | 10-2017-0024980 | A | 3/2017 |

OTHER PUBLICATIONS

Office Action for U.S. Appl. No. 17/856,102; mailed Aug. 30, 2022.

KNIFE WITH SLIDING GEAR

CROSS-REFERENCE TO RELATED APPLICATIONS

This application is a divisional of U.S. patent application Ser. No. 17/966,289, filed Oct. 14, 2022 and titled Knife with Sliding Gear, now U.S. Pat. No. 11,679,517, which is a divisional of U.S. patent application Ser. No. 17/856,102, filed Jul. 1, 2022, and titled Knife with Sliding Gear, now U.S. Pat. No. 11,571,826, the entire content of each of which is incorporated herein by reference.

BACKGROUND

The present disclosure relates to cutting tools, such as utility knives, that comprise means for safely and quickly deploying a blade from a handle and retracting the blade into the handle.

Cutting tools, such as utility knives, have been used in a variety of applications related to manufacturing, packaging, shipping, and construction in order to cut or remove material from an object or workpiece. Cutting tools and knives that incorporate cutting edges often include a means for securing and protecting the cutting edge during storage and transport. Utility knives are typically categorized by the type and method of deploying the blade. These types include fixed blade utility knives, folding utility knives, and retractable utility knives.

Fixed blade utility knives feature blades that are positionally fixed relative to their respective handle. The cutting edge may be fixed in an exposed position relative to the handle. Fixed blade utility knives often include a separate holster, sheath, or operating guard to cover the fixed blade when not in use.

Folding utility knives feature a blade that may be stored at least partially within the handle when the blade is in a closed position and that may be rotated out from a side of the handle into an exposed and open position. These knives often include a lever or mechanism to hold or lock the blade in an open position. When the blade is in the open position, a groove of the handle is typically left exposed (e.g., the groove in which the blade at least partially resides when closed and out of which the blade rotates into the open position). Undesirable material and/or debris may enter into the groove and prevent the knife from properly returning into the closed position. Because the blade typically rotates out of a side of the handle, users are typically unable to fully grip the handle of a folding utility knife during blade deployment or retraction, causing users to loosely or unsafely grip the handle during blade deployment/retraction. This can lead to undesirable outcomes, such as injury.

Retractable or out-the-front ("OTF") utility knives are generally considered safer and easier to operate because the blade is deployed and retracted from a front end of the knife handle. Most retractable utility knives are deployed and retracted by means of an actuator that advances and retracts a blade holder holding the blade. However, for conventional retractable utility knives, the actuator or sliding button travel distance is typically equal to the blade travel distance (or greater than the blade travel distance, such as for snap blade utility knives). To cause the actuator to traverse the entire travel distance (especially for large utility blades), users often reposition their grip on the utility blade handle during blade deployment or retraction, which can present dangers to users and/or cause user fatigue. Alternatively, users hold the handle with one hand and use their other hand to cause the actuator to traverse the travel distance, which can disrupt the flow of work for which the utility blade will be utilized. Although some retractable utility knives can be spring loaded to facilitate rapid blade deployment, spring loaded utility knives are not legal in many jurisdictions.

Accordingly, there is a need for improved utility knives.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

The present disclosure may facilitate improvements over existing utility knives by providing an improved utility knife that uses a pinion gear mechanism to safely deploy the blade. The utility knife advances and rotates a pinion gear against a fixed rack and an opposing moving or sliding rack to permit blade deployment and blade retraction. The pinion gear is mounted to an actuator and rotates about an axis that linearly translates along a housing with the actuator. Advancing the pinion gear while the pinion gear is engaged with the fixed rack causes the pinion gear to rotate as it advances. The pinion gear is further engaged with the opposing moving rack, and the moving rack is advanced by both the travel and rotation of the pinion gear in the same direction as the translational direction of the pinion gear.

Utilizing a pinion gear to facilitate blade deployment and retraction as described herein can facilitate various benefits over existing utility knife deployment mechanisms. For instance, the use of a pinion gear may facilitate an actuator travel distance that is less than a blade travel distance for deployment or retraction. Such functionality can enable users to easily actuate the actuator along its full travel distance using a single digit of their hand while maintaining a full grip on the handle of the utility knife. Enabling users to maintain a full grip on the handle of the utility knife during blade deployment and/or retraction can improve user safety, improve user efficiency, and/or reduce user fatigue and/or strain injury when using the utility knife. Furthermore, pinion gear driven utility knives as presently disclosed may enable rapid blade deployment and/or retraction while avoiding reliance on spring loading or other biasing components, allowing the utility knives of the present disclosure to be used in jurisdictions that prohibit spring loaded knives.

In one embodiment, a utility knife comprises a blade, a blade holder, a housing, a pinion gear, and an actuator. The actuator accessible from an exterior of a handle or housing of the knife and configured to be operated by a thumb or finger(s) of a user. In some instances, the length of actuator may extend across a significant portion of the full length of the housing to permit operation of blade extension and retraction from multiple grip positions (the advantageously large length of the actuator may be enabled by the short actuator travel distance needed to extend/retract the utility blade, as provided by the principles discussed herein).

In one embodiment, the blade holder provides a mount and guide for the blade. The blade holder runs in an internal channel or space formed by the housing. The blade holder includes a sliding rack that is driven by the displacement and rotation of the pinion gear. The blade holder may comprise one or more components that are separate from the blade and that are configured to selectively receive and secure the blade (e.g., enabling various types of blades to be mounted to the blade holder).

In one embodiment, the housing of the knife comprises first and second sidewalls (or first and second scales) and a spacer. The spacer provides a space or channel for the blade, blade holder, and/or pinion gear to function between first and second sidewalls. The spacer includes a fixed rack that induces rotation of the pinion gear as the pinion gear is advanced or retracted by the actuator. The spacer may provide a space or channel to receive the blade holder and allows the blade holder to slide between extended and retracted positions.

In one embodiment, the pinion gear is configured to rotate and linearly translate through a channel of the housing to facilitate deployment of the blade. The pinion gear may contain one or more sets of teeth. The one or more sets of teeth of the pinion gear engage both the fixed and sliding racks. The pinion gear can be coupled to the actuator by a mating post. The pinion gear may be positioned within a clearance space between the first and second sidewalls and may be coupled to the mating post by a fastener.

In an alternative embodiment, the utility knife comprises a blade, a blade holder, a housing, a pinion gear with a stepped configuration (e.g., with multiple sets of teeth and with each set comprising a different diameter), and an actuator. The blade is configured to interact with a desired workpiece and may have one or more knife edges. The blade includes a tang that may feature one or more notches or indentations to engage with the blade holder.

In one embodiment, the blade holder provides a mount for the blade and is configured to engage with the tang of the blade (e.g., by engaging with the notches or indentations of the tang). The blade holder runs in an internal channel formed by the housing. The blade holder includes a sliding rack that is driven by displacement and rotation of the pinion gear. The blade holder features a lever that is configured to selectively engage with and disengage from the tang of the blade to permit replacement of the blade. The lever may feature a biasing element, such as a spring or elastic component, to facilitate joining of the blade tang and blade holder. In one embodiment, the blade holder comprises a magnet configured to bias the blade and/or blade holder into various configurations (e.g., a closed/retracted configuration, an open/deployed configuration, etc.).

In one embodiment, the housing of the knife comprises first and second sidewalls or scales that provide a space or channel for the blade, blade holder, and pinion gear to function between the first and second scales. The first scale includes a fixed rack that induces rotation of the pinion gear as the pinion gear is advanced via the actuator. The first scale includes an elongate opening to facilitate engagement of the actuator and pinion gear. The elongate opening creates a path or track for the actuator to travel between open and closed ends of the knife.

In one embodiment, the pinion gear features a first set of teeth with a first diameter and a second set of teeth with a second diameter. The second diameter is greater than the first diameter. The first set of teeth is configured to engage with the fixed rack, and the second set of teeth is configured to engage with the sliding rack. In one embodiment the pinion gear is located alongside the blade holder (while still permitting both the pinion gear and the blade holder to translate along the length of the utility knife at different rates) to reduce the overall length of the knife housing. The stepped pinion gear configuration allows for a blade travel distance that is greater than or equal to the actuator travel distance (e.g., permitting longer blades with a shorter actuation travel). Additionally, the stepped pinion gear configuration, i.e., the pinion gear having more than one set of teeth, allows the blade to extend at a speed or rate that is greater than the speed or rate of displacement of the actuator. The stepped pinion gear may include one or more intermediate gears that are driven by the pinion gear to further increase the distance and speed of blade travel relative to the distance and speed of actuator travel.

In one embodiment, the utility knife features a non-locking retention system to provide blade retention in extended and retracted blade positions. The utility knife provides a resistance to movement by the actuator until a desired force is reached, thus providing a snap-acting deployment and retraction. In some implementations, the retention system further provides increased safety by allowing automatic retraction of the blade if the blade is unintentionally plunged into an object or surface. The non-locking retention system may include a detent between (i) the blade holder, the blade, and/or the actuator and (ii) a component of the housing. In one embodiment, the detent features are provided by a magnet on the blade holder or blade and corresponding first and second magnets at different positions along the housing (e.g., first and second opposing magnets). The magnets may be positioned such that (i) the magnet of the blade holder is forced toward the first opposing magnet of the housing when the blade holder is translated to a retracted position and (ii) the magnet of the blade holder is forced toward the second opposing magnet of the housing when the blade holder is translated to an extended position. The configuration of magnets can create a bias toward retracted and extended blade configurations. During intentional use, the extended positioning of the blade can be maintained as forces are exerted on the blade (e.g., by using the blade to perform work) by the user gripping the knife handle and maintaining force on the actuator. If an unintentional event occurs while the blade is in the extended configuration, such as dropping of the knife, the user's force on the actuator will no longer be present, and minimum force exerted on the blade (e.g., by the ground, or even a user's shoe) may overcome the attraction between the magnet of the blade holder and the second opposing magnet, thereby causing retraction of the blade and potentially preventing damage that could result from the blade being locked in the extended position during such an event. The magnet configuration may additionally or alternatively facilitate rapid extension and/or retraction of the blade. For example, to extend the blade, a user may apply force to the actuator, which is initially counteracted by the attractive force between the magnet on the blade holder and the first opposing magnet. This causes a buildup of potential energy that is released when the force exerted by the user overcomes the attractive force, which can cause the blade to rapidly advance into the extended configuration, causing a "snap" opening effect. The same is true without loss of generality for facilitating rapid retraction of the blade.

In one embodiment, the utility knife includes a blade with integrated operative features. For example, the actuator may form a significant portion of the housing, such that a portion of the housing is extended or retracted relative to another portion of the housing via engagement with a user's hand. The actuator may extend along a significant length of the housing between an open end (through which the blade extends during extension/retraction) and a closed end. The actuator can be operated by a thumb and/or finger(s) of a user and, as such, may include anatomically appropriate grip formations to allow for multiple grip positions.

In one embodiment, the blade comprises a tang that includes a sliding rack, such that the sliding rack is integrally formed with the blade. Such embodiments may omit a blade holder. The sliding rack is configured to engage with a pinion gear. The housing is formed of a first scale and second scale that form a channel for the blade so that the cutting edge of the blade may be stored. The pinion gear engages with both the sliding rack and a fixed rack via one or more sets of teeth. The pinion gear engages with the actuator through an elongate opening of the first scale and is configured to rotate about a first axis.

In one embodiment, the pinion gear and first axis linearly translate between the open end and closed end of the housing while the pinion gear rotates. The actuator advances the pinion gear while the pinion gear is engaged with the fixed rack, which causes the pinion gear to rotate as it advances. The pinion gear is further engaged with the sliding rack that is advanced by both the travel and rotation of the pinion gear. A first set of teeth of the pinion gear is configured to engage with the fixed rack and a second set of teeth of the pinion gear is configured to engage with the sliding rack. In one embodiment, the first set of teeth and second set of teeth are integrated into the same pinion gear and share the first axis during actuation and operation of the blade. Alternatively, the first set of teeth and second set of teeth may be formed on separate gears that are positioned adjacent to each other to form the pinion gear (thereby sharing the first axis).

In one embodiment, the tang of the utility knife comprises a magnet (e.g., in combination with a fixed rack) that forms a part of a blade retention system (e.g., a non-locking blade retention system). For example, the magnet may interact with first and second opposing magnets associated with the knife housing to bias the blade into an extended or retracted configuration. This can provide various safety benefits (e.g., allowing a small amount of force or contact pressure to cause blade retraction in the case of unintended blade events when the user ceases to maintain a force on the actuator) and/or may facilitate rapid extension and/or retraction of the blade.

These and other aspects of the disclosed utility knife, as well as the methods of operation and functions of the related elements of structure and the combination of parts and economies of manufacture, will become more apparent upon consideration of the following description and the appended claims with reference to the accompanying figures, all of which form a part of this specification.

For purposes of summarizing the disclosed utility knife, certain aspects, advantages and novel features of the utility knife have been described herein. It is to be understood that not necessarily all such advantages may be achieved in accordance with any particular embodiment of the utility knife. Thus, the utility knife may be embodied or carried out in a manner that achieves or optimizes one advantage or group of advantages as taught herein without necessarily achieving other advantages as may be taught or suggested herein.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures are not necessarily drawn to scale.

DETAILED DESCRIPTION

Figure 1A:
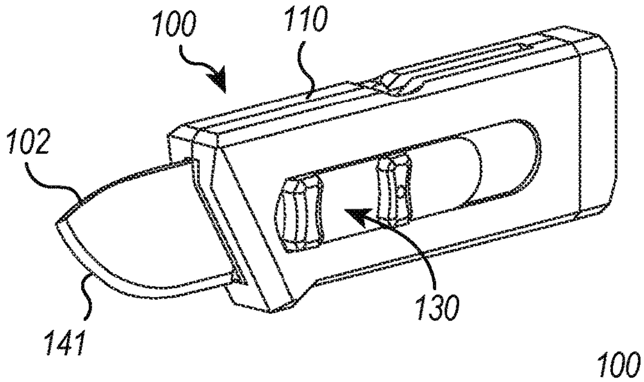
FIG. 1A is a left side view of an example utility knife illustrating a handle and a blade in an extended position in accordance with various embodiments of the present disclosure.

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed.

The intention is to cover all modifications, alternative constructions, combinations, and equivalents that fall within the spirit and scope of the disclosure.

Figure 1B:
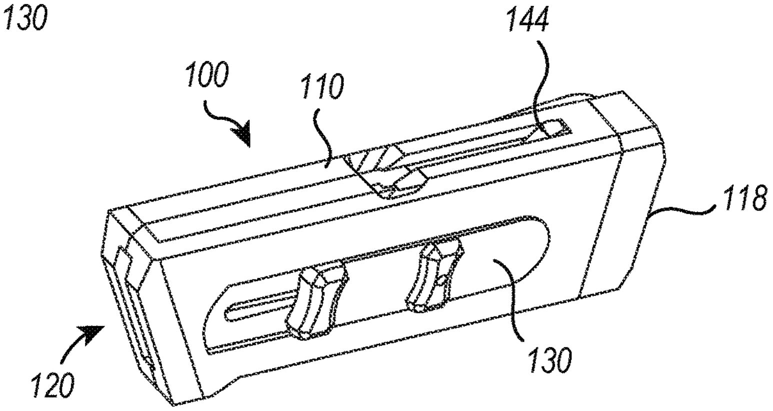
FIG. 1B is a left side view of the utility knife of FIG. 1A illustrating the handle when the blade is in a retracted position in accordance with various embodiments of the present disclosure.

FIGS. 1A-1B depict an example embodiment of a utility knife 100. The utility knife 100 comprises a blade 102 that extends and retracts through an open end 120 of a housing 110. The knife 100 comprises an actuator 130 that is located on an external surface 142 of the housing 110 and configured to extend and retract the blade 102. The blade 102 extends through the open end 120 of the housing 110 as the actuator 130 moves toward the open end 120 of the housing 110. The blade 102 retracts through the open end 120 of the housing 110 as the actuator 130 moves away from the open end 120 of the housing 110.

In some embodiments, the actuator 130 forms a significant portion of the housing 110, such that actuation of the actuator amounts to actuation of a portion of the housing 110 relative to another portion of the housing 110 via engagement with a user's hand. In some embodiments, the actuator 130 extends across a significant length of the housing 110 between the open end 120 and a closed end 118. For instance, the actuator 130 may have a length that is greater than the travel distance associated with the actuator for facilitating extension and/or retraction of the blade 102. In some implementations, the length of the actuator is between 50% and 75% of the full length of the housing. For example, if the length of the housing is 12.7 cm (5 inches), the length of the actuator may be between 6.35 cm (2.5 inches) and 9.525 cm (3.75 inches). In some implementations, the length of the actuator is between 75% and 95% of the full length of the housing. For example, if the length of the housing is 12.7 cm (5 inches), the length of the actuator may be between 9.525 cm (3.75 inches) and 12.065 cm (4.75 inches). In some implementations, the actuator has a length that is within a range having endpoints selected from any two of the foregoing ranges of values. The actuator 130 is configured to be operated by a thumb or finger(s) of a user and, as such, may include anatomically appropriate grip formations to allow for multiple grip positions.

Figure 2:
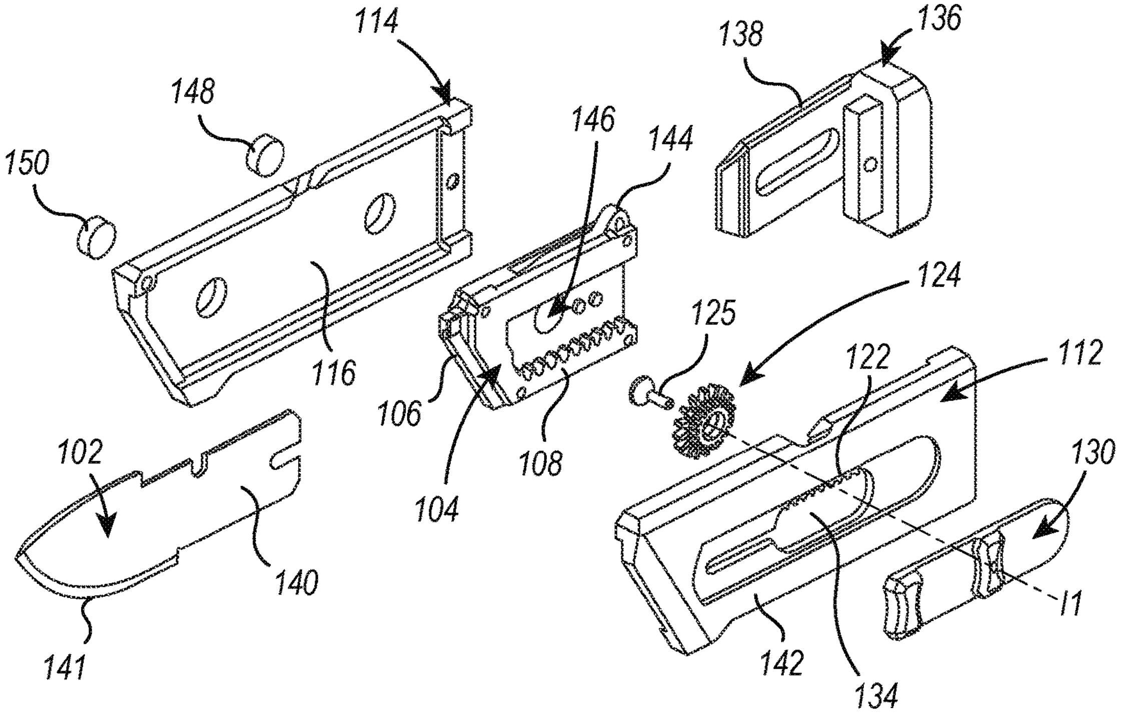
FIG. 2 is an exploded perspective of the utility knife of FIGS. 1A-1B in accordance with various embodiments of the present disclosure.

Referring to FIG. 2, the example embodiment of the utility knife 100 comprises a blade 102 and blade holder 104. The housing 110 may be formed of a first sidewall or scale 112 and second sidewall or scale 114 that form a channel 116 for the blade 102 and blade holder 104. The blade holder 104 may travel longitudinally within the channel 116 to facilitate (i) extension of the edge 141 of the blade 102 through the open end 120 and (ii) retraction of the edge 141 of the blade into the channel 116 (e.g., so that the edge 141 of the blade 102 may be stored during non-use). The knife 100 may feature a tail cap 136 that forms a rear portion of the channel 116. The tail cap 136 may comprise a pocket clip 138, as demonstrated in FIG. 2, which may be arranged on a side of the knife 100 that does not include the actuator 130 to avoid interfering with blade extension or blade retraction.

The blade holder 104 comprises a mount 106 for receiving the blade 102. The blade holder 104 may comprise various components/features for retaining the blade 102 within the blade holder 104 and for facilitating selective withdrawal of the blade 102 from the blade holder 104. In the example of FIG. 2, the blade holder 104 includes a lever 144 that is configured to engage with a tang 140 of the blade 102 to facilitate selective retention of the blade 102 within the blade holder 104 (e.g., by engaging with one or more notches on the tang 140 of the blade 102). The lever 144 can include or cooperate with a biasing member (e.g., a spring) to engage and disengage with the tang 140 of the blade 102 to allow for easy replacement of the blade 102. Additional or alternative blade retention components are within the scope of the present disclosure.

In the example of FIG. 2, the blade holder 104 comprises a sliding rack 108 (e.g., formed into a sidewall of the blade holder 104) that is configured to engage with a pinion gear 124. FIG. 2 illustrates the pinion gear 124 as position-able within the housing 110 by a fastener 125, which fastens the pinion gear 124 to the actuator 130 from within the housing 110 (other types of securing means may be used). The pinion gear 124 may be positioned within a small clearance between the first and second scales 112, 114 of the housing 110. The pinion gear 124 may engage with the actuator 130 through an elongate opening 134 of the first scale 112 (e.g., via the fastener 125). When arranged within the housing 110, the pinion gear 124 may be configured to rotate about a first axis I1, that extends through the center of one or more sets of teeth of the pinion gear.

The pinion gear 124 engages with both the sliding rack 108 and a fixed rack 122 via one or more sets of teeth. For example, the pinion gear 124 may include a first set of teeth 126 and a second set of teeth 128, where the first set of teeth is configured to engage with the fixed rack 122 and the second set of teeth is configured to engage with the sliding rack 108 (see FIG. 4).

FIG. 2 illustrates the pinion gear 124 as located adjacent to the blade holder 104, allowing the pinion gear 124 to engage with the sliding rack 108 of the blade holder 104 from a side of the blade holder 104. The adjacent arrangement of the pinion gear 124 and the blade holder 104 may reduce the overall length of the knife 100 between the open end 120 and closed end 118.

Figure 3:
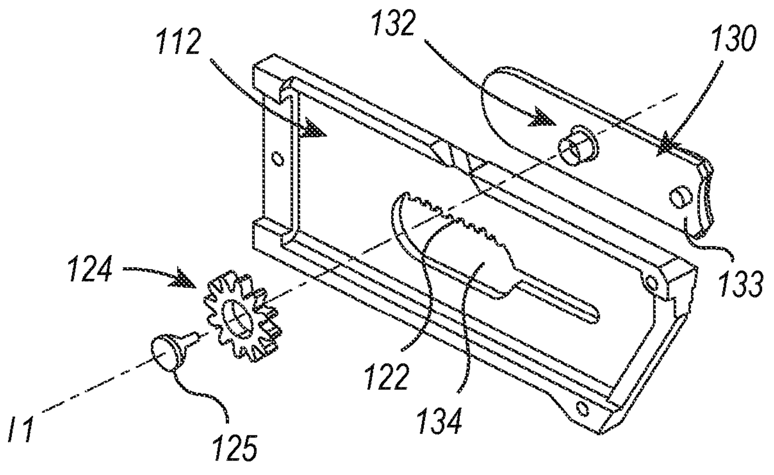
FIG. 3 is an exploded perspective of a sidewall of a handle and corresponding actuation elements in accordance with various embodiments of the present disclosure.

FIG. 3 depicts a sidewall or scale 112 of the housing 110 in relation to the pinion gear 124 and actuator 130 (with various other features of the knife 100 not shown for clarity). FIG. 3 shows the pinion gear 124 configured to engage with a mating post 132 (e.g., via the fastener 125) of the actuator 130 along the first axis I1. When the actuator 130 is linearly translated (e.g., responsive to forces applied by a user's hand), the pinion gear 124 linearly translates along with the actuator while rotating about the first axis I1 via the interaction between teeth of the pinion gear 124 and the fixed rack 122 of the housing 110 (e.g., of sidewall or scale 112). The pinion gear 124 and first axis I1 can thus linearly translate (while rotating) between the open end 120 and closed end 118 of the housing 110. Stated differently, the actuator 130 advances the pinion gear 124 while engaged with the fixed rack 122, which causes the pinion gear 124 to rotate as it advances or retracts. When the pinion gear 124 is further engaged with the sliding rack 108 (see, e.g., FIGS. 4 through 5B), the sliding rack 108 is advanced or retracted (along with the blade holder 104 and the blade 102) by both the linear translation and rotation of the pinion gear 124. Such functionality may enable the blade holder 104 and the blade 102 to translate a greater linear distance than the linear distance traversed by the actuator 130 (and pinion gear 124). Such functionality may additionally enable the blade holder 104 and the blade 102 to linearly translate at a greater rate than a linear translation rate associated with the actuator 130 (and pinion gear 124).

FIG. 3 illustrates that the actuator 130 may also comprise a second post 133 configured to extend into a portion (e.g., a narrowed portion) of the elongate opening 134 of the housing 110. The engagement between the second post 133 and the elongate opening 134 may prevent rotation of the actuator 130.

Figure 4:
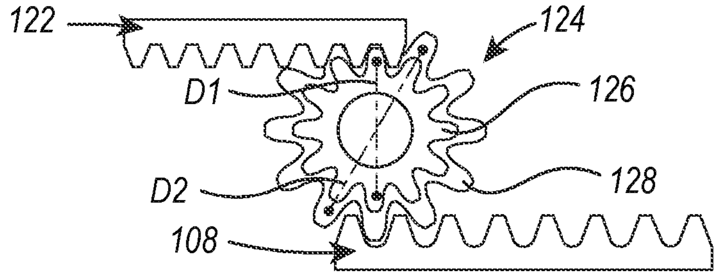
FIG. 4 is a detailed view of a stepped pinion gear in accordance with various embodiments of the present disclosure.

FIG. 4 provides a detailed view of a stepped pinion gear 124 engaged with the fixed rack 122 of the housing 110 and the sliding rack 108 of the blade holder 104. In the example of FIG. 4, the pinion gear 124 comprises a first set of teeth 126 and a second set of teeth 128. The first set of teeth 126 is configured to engage with the fixed rack 122, and the second set of teeth 128 is configured to engage with the sliding rack 108. The stepped pinion gear 124 has a first diameter D1 associated with the first set of the teeth 126 and a second diameter D2 associated with the second set of teeth 128. The second diameter D2 of the second set of teeth 128 is greater than the first diameter D1 of the first set of teeth 126. In one embodiment, the first set of teeth 126 and second set of teeth 128 are integrated into the same pinion gear 124 and share the first axis I1 during actuation and operation of the blade 102. Alternatively, the first set of teeth 126 and second set of teeth 128 may be formed on separate gears and be positioned adjacent to each other to form the pinion gear 124 (e.g., still sharing the first axis I1).

Figure 5A:
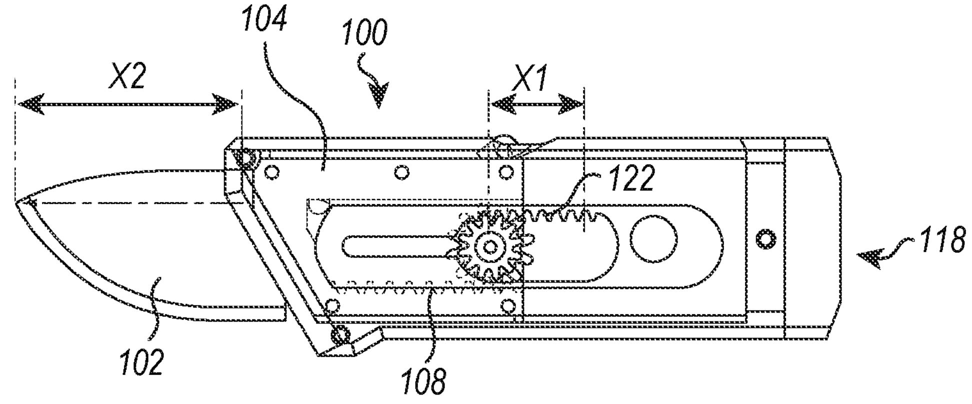
FIG. 5A is a partial cut away plan view of a utility knife with a blade in an extended position in accordance with various embodiments of the present disclosure.
Figure 5B:
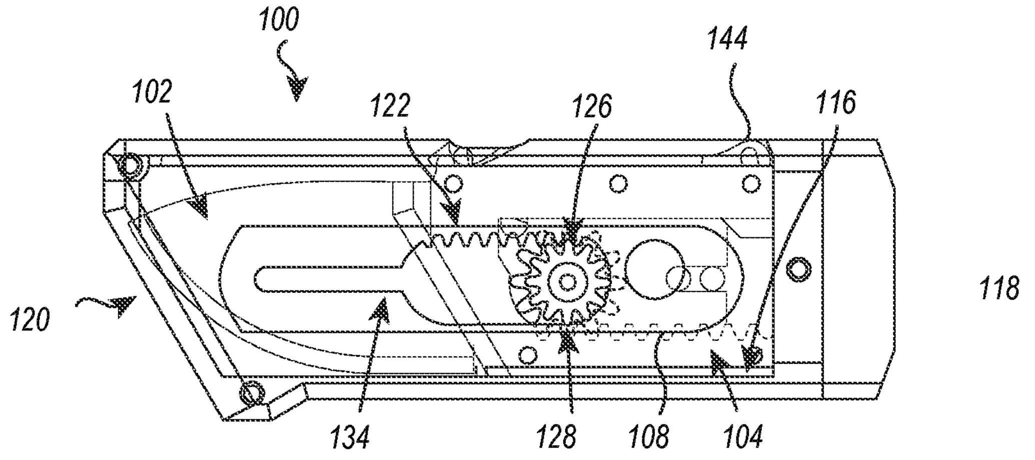
FIG. 5B is a partial cut away plan view of the utility knife of FIG. 5A with a blade in a retracted position in accordance with various embodiments of the present disclosure.

FIGS. 5A-5B depicts detailed operation of the pinion gear 124 with a first set of teeth 126 and a second set of teeth 128. The difference between the first diameter D1 and second diameter D2 can contribute to an increased distance traveled by the blade 102 (e.g., relative to the distance traveled by the pinion gear 124 and/or actuator 130 to facilitate movement of the blade 102). As the pinion gear 124 is displaced by a first distance X1, the actuator 130 is displaced by the same first distance X1. The first set of teeth 126 of the pinion gear 124 is rotated by engagement with the fixed rack 122 and has an arc length of rotation that is equal to the first distance X1. The second set of teeth 128 of the pinion gear 124 is rotated (during translation) by an arc length that is greater than the first distance X1 (e.g., in view of the difference in diameter between the first set of teeth 126 and the second set of teeth 128). The sliding rack 108 is simultaneously displaced in the same direction as the actuator 130 and the pinion gear 124 via the interaction of the second set of teeth 128 and the sliding rack 108, either toward the open end 120 or toward the closed end 118. The sliding rack 108 is advanced by the second distance X2 that is greater than the first distance X1.

In an example embodiment, the first set of teeth 126 of the pinion gear 124 has a first diameter D1 equal to 9.525 mm (0.375 inches) and the second set of teeth 128 of the pinion gear 124 has a second diameter D2 equal to 12.7 mm (0.5 inches). The difference in diameters D1 and D2 results in an increase ratio of blade travel distance X2 (or second distance X2) to actuator travel distance X1 (or first distance X1) that is greater than 2:1, i.e., 2.33. Other diameters of first and second sets of teeth 126, 128 may be used on the stepped pinion gear 124 to reduce or increase the desired travel ratio. In an alternative embodiment, a stepped pinion gear 124 may have a first set of teeth 126 with a first diameter D1 equal to 9.525 mm (0.375 inches) and a second set of teeth 128 with a second diameter D2 equal to 19.05 mm (0.75 inches) for an overall ratio of blade travel distance of X2 to actuator travel distance X1 equal to 3:1. The knife 100 may include one or more additional or intermediate gears that are driven by the pinion gear 124 to further increase the blade travel distance X2 (e.g., relative to actuation distance of the actuator 130). One or more of the sets of teeth 126, 128 could be replaced by a lever or levers. At least one of or both sliding rack 108 and fixed rack 122 may comprise segments of a diametral gear that provides a curved path of actuation or curved path of deployment as desired. In these cases, the associated path or channel 116 for the actuator 130 or housing 110 may be curved also.

Figure 6A:
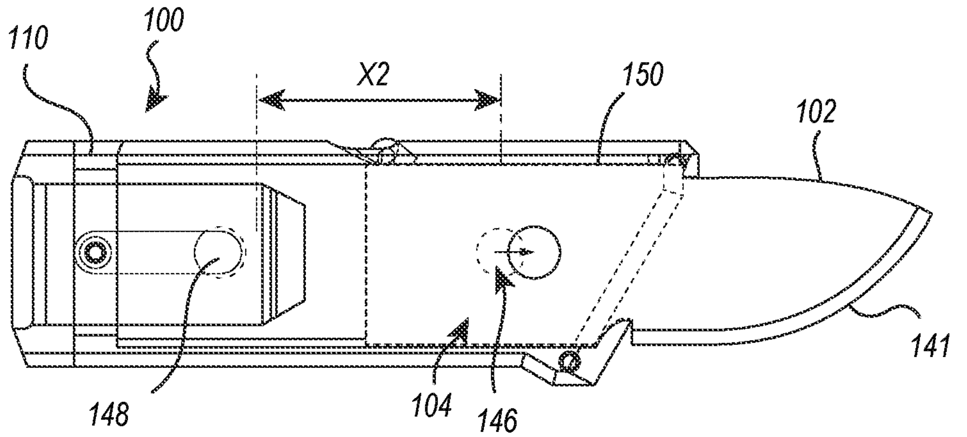
FIG. 6A is a partial cut away plan view of a utility knife with a blade in an extended position in accordance with various embodiments of the present disclosure.
Figure 6B:
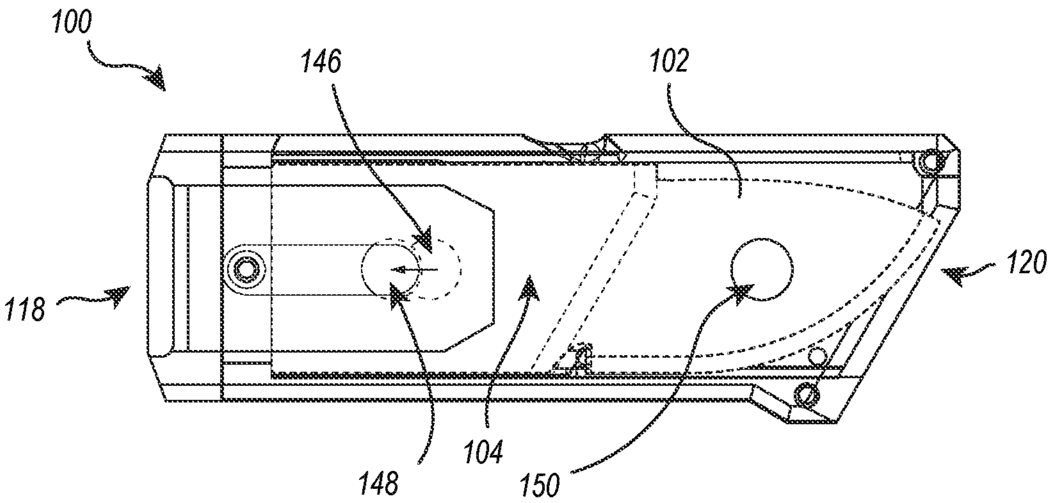
FIG. 6B is a partial cut away plan view of the utility knife of FIG. 6A with a blade in a retracted position in accordance with various embodiments of the present disclosure.

FIG. 6A-6B illustrate side views of the knife 100, with certain internal features of the knife shown in dashed lines for clarity. As shown in FIGS. 6A and 6B, the knife 100 comprises a retention system that includes magnets 146, 148, 150 as detent features. FIG. 6A shows the knife 100 in the extended position, whereas FIG. 6B shows the knife 100 in the retracted position (FIG. 6A shows the blade travel distance X2 that the blade 102 and blade holder 104 may traverse between the extended position of FIG. 6A and the retracted position of FIG. 6B).

The blade holder 104 comprises a magnet 146, and the housing 110 of the knife 100 comprises a first opposing magnet 148 that is positioned toward (or proximate to) the closed end 118 of the housing 110 and a second opposing magnet 150 that is positioned toward (or proximate to) the open end 120 of the housing 110. The first opposing magnet 148 is configured to interact with the magnet 146 to create a bias toward a retracted position (without rigidly locking the knife in the retracted position), as indicated in FIG. 6B by the arrow extending from magnet 146 toward magnet 148. The second opposing magnet 150 is configured to interact with the magnet 146 to create a bias toward an extended position (without rigidly locking the knife in the extended position), as indicated in FIG. 6A by the arrow extending from magnet 146 toward magnet 150. The detent (magnet) features provide a non-locking blade extension and retraction system.

To operate the knife 100, a user applies force to the actuator 130. The force is stored in the user's finger and then rapidly released when the force applied by the user exceeds the attractive forces of the magnets 146 and 148 (or the attractive forces of the magnets 146 and 150). This allows the blade 102 to snap open or closed in a rapid manner.

During intentional use with the blade 102 in the extended position (where reactionary forces are exerted on the blade 102 through use of the blade 102), the user can maintain the extended positioning of the blade 102 by exerting or maintaining force on the actuator 130. When no force is maintained on the actuator 130, the blade 102 is able to advantageously (and safely) retract through the open end 120 in response minimal contact pressure to the blade 102 and/or edge 141 thereof. The blade 102 is configured to be replaceable and may be removed from the blade holder 104 via lever 144.

In some implementations, for magnetizable blades, the magnet 146 of the blade holder 104 can advantageously provide the additional functionality of further securing the blade 102 to the blade holder 104 to reduce free play (or undesired rattling or other movement) of the blade 102 while the blade 102 is secured to the blade holder 104.

Although the example of FIGS. 6A and 6B focuses, in at least some respects, on utilizing oppositely polarized magnets on the blade holder and the housing, other types of detents may be used. For example, a combination of one or more magnets and one or more magnetizable components may be utilized, such as a magnet on the blade holder (or blade itself) in combination with ferromagnetic inserts on the housing (with other portions of the housing being substantially non-magnetizable). An opposite arrangement may be utilized in accordance with the present disclosure (e.g., magnets on the housing and a ferromagnetic insert on the blade holder or blade). Furthermore, one will appreciate, in view of the present disclosure, that other types of detent features in addition to or as an alternative to magnets may be utilized. For example, detent features may additionally or alternatively include one or more spring biasing features configured to engage with opposing detent feature(s) such as a ball detent.

Furthermore, although the present disclosure focuses, in at least some respects, on implementing non-locking retention systems with detent features, locking retention systems may be implemented in accordance with the principles described herein. For example, detent features may comprise one or more locking features to secure the blade in the extended or retracted position. Such locking features may become automatically locked (e.g., operating automatically when the blade is moved into the extended or retracted position) and/or manually actuated (e.g., to facilitate unlocking) by a user via a lock actuator.

Figure 7:
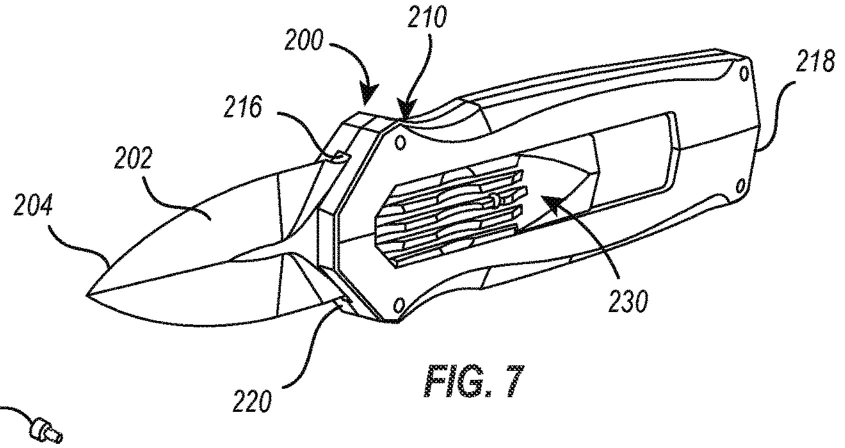
FIG. 7 is a left side view of an example utility knife illustrating a handle and a blade in an extended position in accordance with various embodiments of the present disclosure.

FIG. 7 depicts an example utility knife 200 that features a blade 202 with at least some integrated operative features. The utility knife 200 comprises a housing 210 and a blade 202 featuring an edge 204. The knife 200 comprises an actuator 230 that is externally located on the housing 210 and configured to cause extension and retraction of the blade 202. The blade 202 extends through the open end 220 of the housing 210 as the actuator 230 moves toward the open end 220 of the housing 210. The blade 202 retracts through the open end 220 of the housing 210 as the actuator 230 moves toward the closed end 218 of the housing 210. In some embodiments, the actuator 230 extends a significant length of the housing 210 between the open end 220 and a closed end 218. The actuator 230 is configured to be operated by a thumb or finger(s) of a user and, as such, may include anatomically appropriate grip formations to allow for multiple grip positions.

Figure 8:
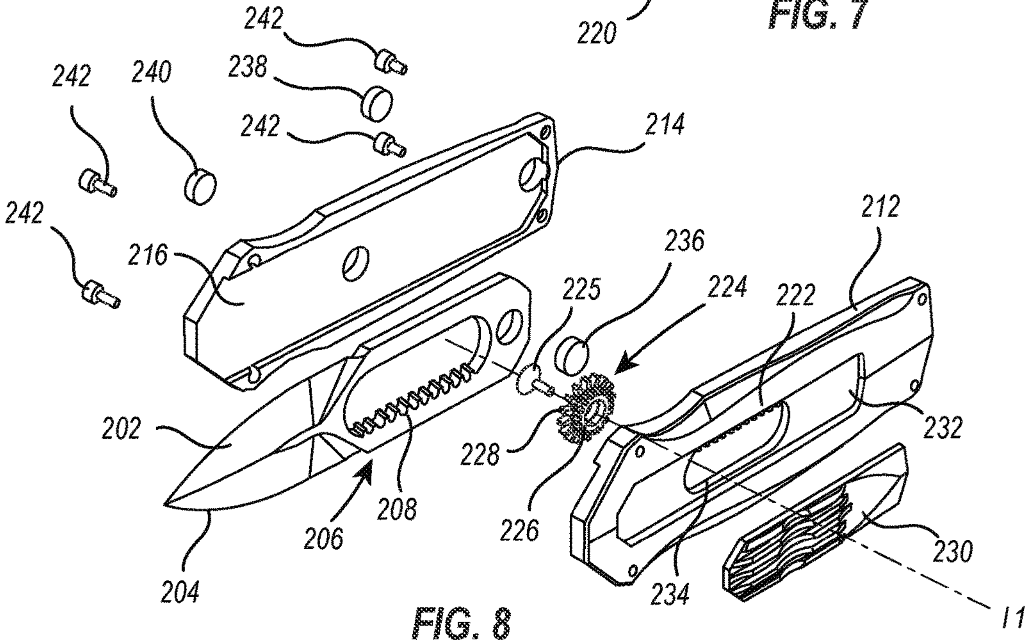
FIG. 8 is an exploded perspective of the utility knife of FIG. 7 in accordance with various embodiments of the present disclosure.

Referring to FIG. 8, the example embodiment of the utility knife 200 comprises a blade 202 and a housing 210. The housing 210 may be formed of a first scale 212 and second scale 214 (held together by fasteners 242) that form a channel 216 for the blade 202 so that the cutting edge 204 of the blade 202 may be stored. The blade 202 comprises a tang 206 and a sliding rack 208 (integrally formed with the tang 206 of the blade 202) that is configured to engage with a pinion gear 224. The pinion gear 224 is positioned within the housing 210 by a fastener 225. The pinion gear 224 engages with both the sliding rack 208 and a fixed rack 222 (of the housing 210, in particular of the scale 212) and may contain one or more sets of teeth (e.g., a first set of teeth 226 and a second set of teeth 228). The sliding rack 208 is configured to oppose the fixed rack 222 of the knife 200 (e.g., with the teeth of the sliding rack 208 being oriented substantially opposite to the teeth of the fixed rack 222). The pinion gear 224 engages with the actuator 230 through an elongate opening 234 of the first scale 212 and forms a first axis I1. The first scale 212 additionally features a groove 232 within which the actuator 230 may translate along the first scale 212.

The pinion gear 224 rotates about the first axis I1 while linearly translating between the open end 220 and closed end 218 of the housing 210. The actuator 230 advances (or retracts) the pinion gear 224 while the pinion gear 224 is engaged with the fixed rack 222, which causes the pinion gear 224 to rotate as it advances (or retracts). The pinion gear 224 is further engaged with the opposing sliding rack 208, is advanced (or retracted) by both the travel and rotation of the pinion gear 224. The first set of teeth 226 is configured to engage with the fixed rack 222 and the second set of teeth 228 is configured to engage with the sliding rack 208.

Similar to the retention system discussed hereinabove with reference to FIGS. 6A and 6B, the knife 200 may comprise a retention system that includes magnet 236, and ferromagnetic inserts 238, 240 as detent features. Rather than being positioned on a blade holder (e.g., as magnet 146 in the example of FIGS. 6A and 6B), the magnet 236 of FIG. 8 is positioned on the tang 206 of the blade 202. The ferromagnetic inserts 238 and 240 are positioned in a non-magnetic scale 214. The magnet 236 and inserts 238 and 240 may facilitate non-lock blade extension and retraction functionality that is similar to that described as facilitated by magnets 146, 148, and 150 with reference to FIGS. 6A and 6B.

Figure 9A:
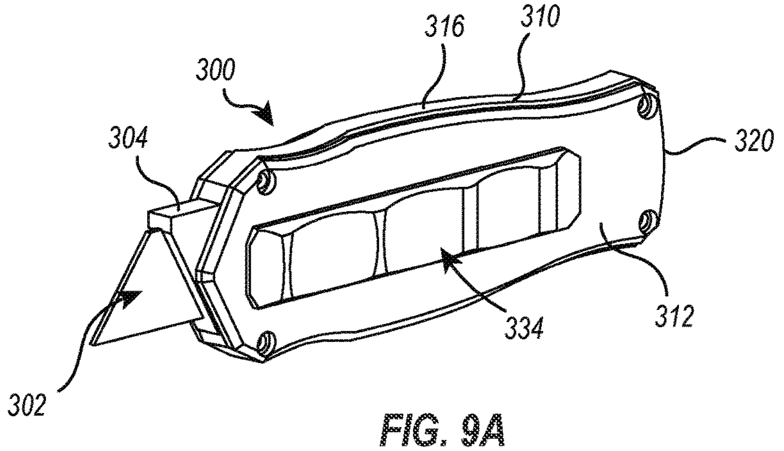
FIG. 9A is a left side view of an example utility knife illustrating a handle and a blade in an extended position in accordance with various embodiments of the present disclosure.
Figure 9B:
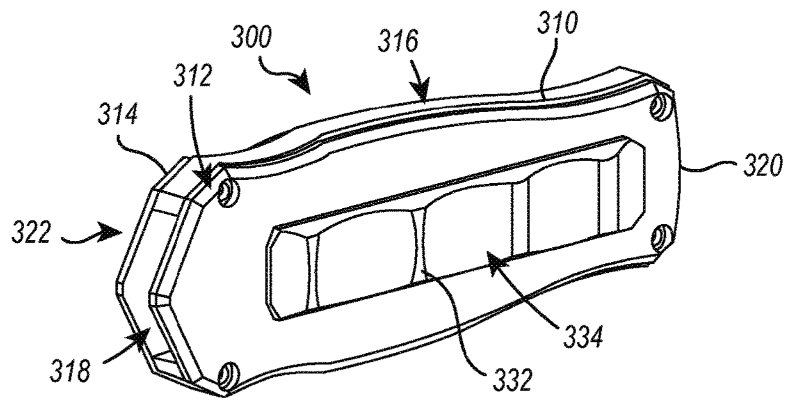
FIG. 9B is a left side view of the utility knife of FIG. 9A illustrating the handle when the blade is in a retracted position in accordance with various embodiments of the present disclosure.

FIGS. 9A-9B depict an example embodiment of a utility knife 300. The utility knife 300 comprises a blade 302 that extends and retracts through an open end 322 of a housing 310. The knife 300 comprises an actuator 334 that is externally located to the housing 310 and configured to extend and retract the blade 302. The blade 302 extends through the open end 322 of the housing 310 as the actuator 334 moves toward the open end 322 of the housing 310. The blade 302 retracts through the open end 322 of the housing 310 as the actuator 334 moves toward the closed end 320 of the housing 310. In some embodiments, the actuator 334 extends along a significant length of the housing 310 between the open end 322 and a closed end 320. The actuator 334 is configured to be operated by a thumb or finger(s) of a user and, as such, may include anatomically appropriate grip formations 332 to allow for multiple grip positions.

Figure 10:
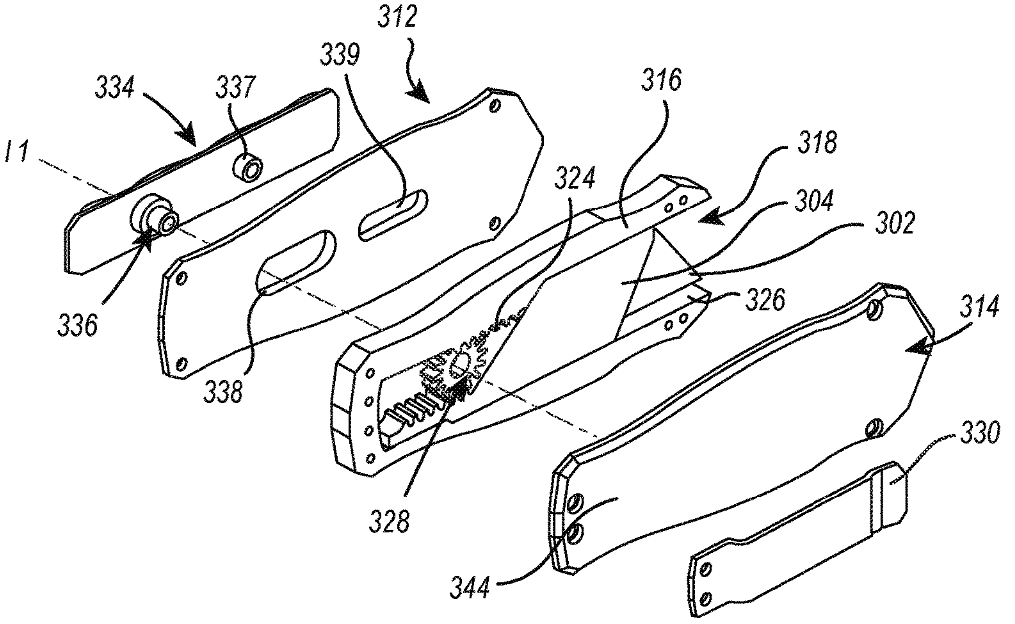
FIG. 10 is an exploded perspective of the utility knife of FIGS. 9A-9B in accordance with various embodiments of the present disclosure.
Figure 11:
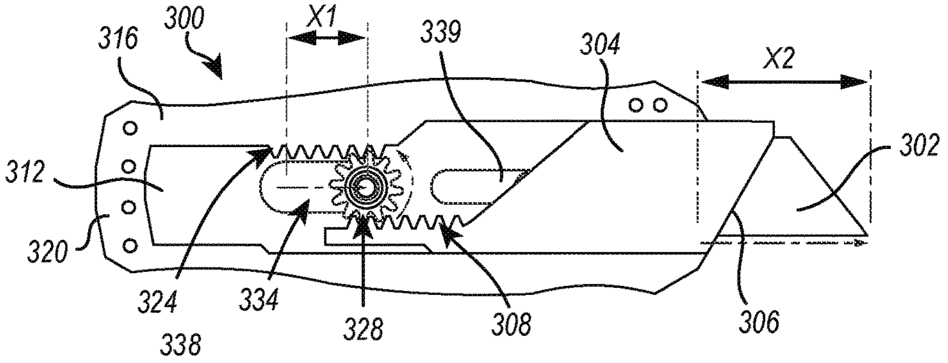
FIG. 11 is a partial cut away plan view of the utility knife of FIGS. 9A-9B with a blade in a retracted position in accordance with various embodiments of the present disclosure.

Referring to FIGS. 10 and 11, the example embodiment of the utility knife 300 comprises a blade 302, blade holder 304, and housing 310. The housing 310 may be formed of a first scale or sidewall 312, second scale or sidewall 314, and spacer 316 that forms a channel 318 for the blade 302 and blade holder 304 so that the blade 302 may be stored safely within the channel 318 (the spacer 316 may, in some instances, be regarded as part of a housing of a knife in accordance with the present disclosure). The blade holder 304 comprises a mount 306 for the blade 302 and a sliding rack 308 that is configured to engage with a pinion gear 328.

The pinion gear 328 is positioned within the housing 110 between the sliding rack 308 of the blade holder 304 and a fixed rack 324 of the spacer 316. The fixed rack 324 of the spacer 316 may be arranged on an internal surface 326 of the spacer 316. The pinion gear 328 may be positioned within a small clearance between the first and second sidewalls 312, 314. The pinion gear 328 engages with both the sliding rack 308 and the fixed rack 324. The pinion gear 328 engages with the actuator via a post 336 of the actuator 334 through an elongate opening 338 of the first sidewall 312. The pinion gear 328 is configured to rotate about a first axis I1 when connected to the actuator 334. The actuator 334 may also feature a second post 337 that is configured to translate along and through a second elongate opening 339 (e.g., to prevent rotation of the actuator 334). The knife 300 may feature a pocket clip 330. In the example of FIG. 10, the pocket clip 330 is that located on an external surface 344 of the second sidewall 314.

FIG. 11 depicts detailed operation of the pinion gear 328. In the illustrated embodiment, the pinion gear 328 comprises a single set of teeth that engages with both the sliding rack 308 and fixed rack 324. In some implementations, utilizing a single set of teeth for the pinion gear 328 may enable a thinner knife construction. To extend the blade 302, a user slides the actuator 334 toward the open end 322. As the actuator 334 travels a first distance X1, the actuator 334 advances the pinion gear 328 by the same first distance X1. The pinion gear 328 is also rotated by its engagement with the fixed rack 324, and the arc length of the rotation of the pinion gear 328 at the pitch diameter of the pinion gear 328 is equal to the first distance X1. The sliding rack 308 is advanced in the same direction toward the open end 322 and is advanced by a distance composed of the translational first distance X1 and also the rotational arc length that the pinion gear 328 rotates (which is equal to the first distance X1), resulting in a total distance traveled X2 (which, in the illustrated embodiment, is twice the first distance X1). Retraction of the blade 302 follows the reverse process as a user slides the actuator 334 away toward the closed end 320.

Figure 12A:
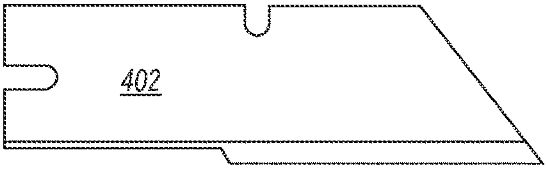
FIGS. 12A-12F illustrate side plan views of various implementations of utility knife blade configurations for use in accordance with various embodiments of the present disclosure.
Figure 12B:
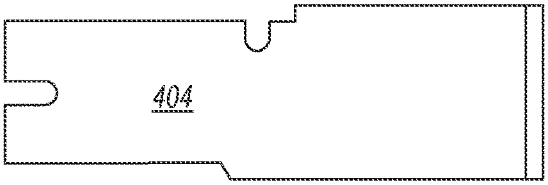
Figure 12C:
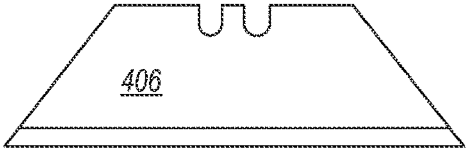
Figure 12D:
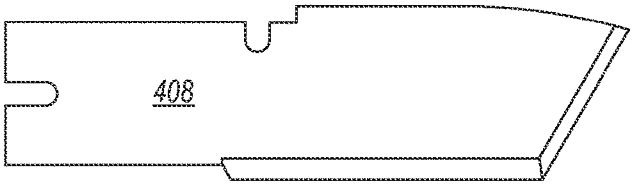
Figure 12E:
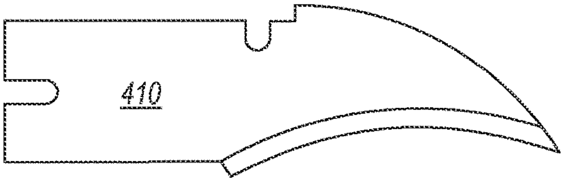
Figure 12F:
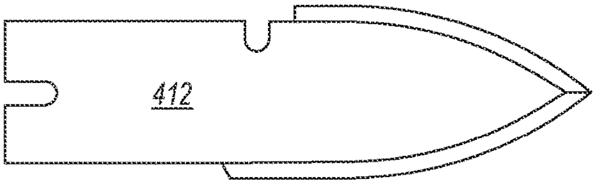

One will appreciate, in view of the present disclosure, that the particular shapes, forms, relative sizes, and/or other granular aspects of the components or features of the embodiments described herein and shown in the Figures are provided by way of example only and are not limiting of the principles described herein. For instance, the blades shown and described hereinabove are not limiting of the principles described herein, and various types of blades may be implemented in knives/knife systems of the present disclosure. For instance, FIGS. 12A through 12F provide various example knife configurations/forms that may be utilized in implementations of the present disclosure. FIG. 12A depicts a side plan view of a blade 402 having a Wharncliffe configuration. FIG. 12B depicts a side plan view of a blade 404 having a square end configuration. FIG. 12C depicts a side plan view of a blade 406 having a straight edge utility blade configuration. FIG. 12D depicts a side plan view of a blade 408 having a Tanto configuration. FIG. 12E depicts a side plan view of a blade 410 having a Karambit configuration. FIG. 12F depicts a side plan view of a blade 412 having a spear point configuration.

Furthermore, the features and/or components of one embodiment, example, or Figure discussed, shown, or suggested hereinabove may be combined with features and/or components of other embodiments, examples, or Figures discussed, shown, or suggested herein to provide embodiments, examples, or implementation variations that are not explicitly verbally or visually described or shown herein.

Other configurations of knives, blades, and housings can be used to incorporate a pinion gear configured to rotate and linearly translate to facilitate deployment of the blade as described herein. These and other alternatives will readily occur to the skilled artisan in view of the present disclosure and are encompassed within the subject matter of the present disclosure.

In light of the disclosure herein, one example embodiment of a utility knife may include a blade and a pinion gear configured to (i) rotate and (ii) linearly translate to facilitate deployment of the blade.

In some embodiments, the utility knife can also include a blade holder comprising a mount for the blade and further comprising a sliding rack.

In some embodiments, the utility knife can also include a housing comprising a channel for receiving the blade and the blade holder, the channel extending from a closed end of the housing to an open end of the housing, wherein the housing comprises a fixed rack.

In some embodiments, the utility knife can also include an actuator, wherein the pinion gear comprises one or more sets of teeth configured to engage with the sliding rack of the blade holder and the fixed rack of the housing and wherein the actuator is configured to engage with the pinion gear to permit blade deployment and blade retraction through the open end of the housing.

In some embodiments, the pinion gear comprises a first set of teeth having a first diameter and a second set of teeth having a second diameter, the first set of teeth configured to engage the fixed rack and the second set of teeth configured to engage the sliding rack.

In some embodiments, displacement of the actuator between the closed and open ends of the housing by a first distance causes displacement of the blade by a second distance that is greater than the first distance.

In some embodiments, the blade holder comprises a magnet and the housing comprises a first opposing magnet proximate to the closed end of the housing and a second opposing magnet proximate to the open end of the housing.

In some embodiments, the magnet and the first opposing magnet create a first bias toward blade retraction, and wherein the magnet and the second opposing magnet create a second bias toward blade deployment.

In some embodiments, the blade is selectively removable from the housing.

In some embodiments, the actuator is configured to actuate between the closed and open ends of the housing and along an external surface of a first scale of the housing.

In another embodiment, a utility knife includes a blade comprising a cutting edge and a tang, the tang comprising a sliding rack; a housing comprising a channel for receiving the blade and the tang thereof, the channel extending from a closed end of the housing to an open end of the housing, wherein the housing comprises a fixed rack; a pinion gear comprising one or more sets of teeth and configured to engage with the sliding rack of the tang of the blade and the fixed rack of the housing; and an actuator configured to engage with the pinion gear to permit blade deployment and blade retraction through the open end of the housing.

In some embodiments, the pinion gear comprises a first pitch diameter having a first set of teeth and a second pitch diameter having a second set of teeth, the first set of teeth configured to engage the fixed rack and the second set of teeth configured to engage the sliding rack.

In some embodiments, displacement of the actuator between the closed and open ends of the housing by a first distance simultaneously displaces the blade at the open end by a second distance that is greater than the first distance.

In some embodiments, the tang comprises a magnet and the housing comprises a first opposing magnet proximate to the closed end of the housing and a second opposing magnet proximate to the open end of the housing.

In some embodiments, the magnet and the first opposing magnet create a first bias for blade retraction, and wherein the magnet and the second opposing magnet create a second bias for blade deployment.

In some embodiments, the actuator extends between the closed and open ends of the housing and along an external surface of the housing.

In yet another embodiment, a utility knife includes a blade; a blade holder comprising a mount for the blade and further comprising a sliding rack; a housing comprising a first sidewall, a second sidewall, and a spacer, the spacer being positioned between the first and second sidewalls and forming a channel for receiving the blade holder and the blade, the channel extending from a closed end of the housing to an open end of the housing, wherein the spacer comprises a fixed rack on an internal surface of the spacer; a pinion gear comprising one or more sets of teeth and configured to engage with the sliding rack of the blade holder and the fixed rack of the spacer; and an actuator configured to engage with the pinion gear to permit blade deployment and blade retraction through the open end of the housing.

In some embodiments, the pinion gear comprises a first diameter having a first set of teeth and a second diameter having a second set of teeth.

In some embodiments, the first set of teeth engage the fixed rack, and wherein the second set of teeth engage the sliding rack.

In some embodiments, displacement of the actuator between the closed and open ends of the housing by a first distance simultaneously displaces the blade by a second distance that is greater than the first distance.

In some embodiments, the utility knife can also include the blade holder comprises a magnet and the housing comprises a first opposing magnet proximate to the closed end of the housing and a second opposing magnet proximate to the open end of the housing, and wherein the magnet and the first opposing magnet create a first bias for blade retraction, and wherein the magnet and the second opposing magnet create a second bias for blade deployment.

In some embodiments, the actuator extends between the closed and open ends of the housing and along an external surface of the housing.

It is to be understood that even though numerous characteristics and advantages of various embodiments of the present disclosure have been set forth in the foregoing description, together with details of the structure and function of various embodiments thereof, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A utility knife, comprising:

a handle comprising or has attached thereto a first geared rack;

a blade holder configured to have a blade mounted therein or thereto, the blade holder comprising a second geared rack that is configured to facilitate advancing and retracting movement of the blade holder and the blade relative to the handle, wherein the first geared rack remains in a fixed positional relationship with the handle when the blade holder and the blade are advancing and retracting relative to the handle.

2. The utility knife of claim 1, further comprising a pinion gear rotatably disposed between the first and second geared racks.

3. The utility knife of claim 2, wherein the pinion gear is configured to (i) rotate about an axis and (ii) linearly translate such that the axis moves along a portion of a length of the utility knife a first distance to facilitate movement of the blade holder and the blade a second distance, the second distance being different than the first distance.

4. The utility knife of claim 1, wherein the handle comprises a spacer forming a channel configured to have the blade holder movably disposed therein.

5. The utility knife of claim 4, wherein the first geared rack of the handle is disposed on an interior surface of the channel formed by the spacer.

6. The utility knife of claim 5, wherein the channel formed by the spacer has an open end through which the blade is configured to be at least partially deployed from the handle.

7. The utility knife of claim 4, wherein the handle further comprises first and second sidewalls disposed on opposing sides of the spacer.

8. A utility knife, comprising:

a handle comprising:

a spacer;

first and second sidewalls disposed on opposing sides of the spacer, the spacer and opposing first and second sidewalls cooperating to form a channel in the handle configured to receive at least a portion of a blade therein; and a geared rack associated with the spacer;

a movable geared rack configured to be associated with the blade in the channel; and a pinion gear rotatably engaged with the geared rack of the handle and the movable geared rack, rotation of the pinion gear being configured to cause selective advancing and retracting movement of the blade relative to the handle, wherein:

the spacer and the first and second sidewalls have a fixed position relative to one another during the selective advancing and retracting movement of the blade relative to the handle; and the geared rack is disposed in a fixed position relative to the spacer and the first and second sidewalls during the selective advancing and retracting movement of the blade relative to the handle.

9. The utility knife of claim 8, further comprising a blade holder movably disposed within the channel, the blade holder being configured to have the blade mounted therein or thereon.

10. The utility knife of claim 9, wherein the movable geared rack is formed or mounted on the blade holder.

11. The utility knife of claim 9, wherein the blade holder is configured to have the blade mounted therein or thereon such that movement of the blade holder results is a corresponding movement of the blade.

12. The utility knife of claim 8, wherein the movable geared rack is associated with the blade such that movement of the movable geared rack results is a corresponding movement of the blade.

13. The utility knife of claim 8, wherein the pinion gear is configured to (i) rotate about an axis and (ii) linearly translate such that the axis moves along a portion of a length of the utility knife a first distance to facilitate movement of the blade a second distance, the second distance being different than the first distance.

14. A utility knife, comprising:

a handle comprising a spacer, the spacer having opposing internal surfaces, an open end, and a fixed geared rack associated with one of the opposing internal surfaces, the opposing internal surfaces cooperating to form a channel within the spacer;

a sliding geared rack movably disposed within the handle and configured to move a blade or blade holder disposed at least partially within the handle; and a pinion gear disposed within the channel and engaged with the fixed geared rack associated with the spacer and the sliding geared rack, rotation of the pinion gear being configured to cause the sliding geared rack to move relative to the spacer, the pinion gear being configured to rotate and translate to cause the blade or blade holder to move relative to the spacer.

15. The utility knife of claim 14, wherein the handle further comprises opposing first and second sidewalls disposed on opposing sides of the spacer.

16. The utility knife of claim 14, wherein the fixed geared rack associated with one of the opposing internal surfaces of the spacer is formed on or fixedly connected to the one of the opposing internal surfaces of the spacer such that the fixed geared rack and the spacer have a fixed positional relationship.

17. The utility knife of claim 14, further comprising an actuator connected to the pinion gear, wherein movement of the actuator causes the pinion gear to move relative to the spacer.

18. The utility knife of claim 14, wherein the pinion gear comprises a first set of teeth that engage the fixed geared rack associated with the spacer and a second set of teeth that engage the sliding geared rack.

19. The utility knife of claim 14, further comprising a blade holder disposed at least partially within the channel and configured for selective movement relative thereto, the blade holder being configured to have a blade mounted thereto.

* * * * *